United States Patent [19]

Nagaich

[11] Patent Number: 5,480,602
[45] Date of Patent: Jan. 2, 1996

[54] EXTRUDED PARTICLE BOARD

[76] Inventor: Laxmi Nagaich, 6592 Hawthorne St., Worthington, Ohio 43085

[21] Appl. No.: 261,969

[22] Filed: Jun. 17, 1994

[51] Int. Cl.⁶ .............................. C08J 1/02; B29C 47/00
[52] U.S. Cl. .............................. 264/122; 264/109; 524/13
[58] Field of Search .................................. 264/109, 122, 264/DIG. 69; 524/13, 14, 15, 16

[56] References Cited

U.S. PATENT DOCUMENTS

| | | | |
|---|---|---|---|
| 5,064,592 | 11/1991 | Ueda et al. | 264/109 |
| 5,082,605 | 1/1992 | Brooks et al. | 264/40.6 |
| 5,088,910 | 2/1992 | Goforth et al. | 425/142 |

Primary Examiner—Mary Lynn Theisen
Attorney, Agent, or Firm—George Wolken, Jr.

[57] ABSTRACT

The present invention relates to an improved material and manufacturing method for the extrusion of particle board. It is shown herein that the use of fine particles of lignocellulosic material, typically wood, in combination with an extrudable plastic, allows an increased proportion of wood to be used (typically greater than 50% by weight, wood to plastic) and still obtain an extrudable particle board with good quality surface finish. The use of wood particles finer than approximately 40 mesh is used in the production of extruded particle board in the present invention. A coupling agent is also used consisting of a polyurethane-type coupling agent, added in an amount of approximately 3% by weight, to the extrusion mixture prior to extrusion. This combination of fine wood particles and the above coupling agent yields good quality extruded particle board having a majority of the composition thereof consisting of wood or other lignocellulosic material.

14 Claims, No Drawings

EXTRUDED PARTICLE BOARD

FIELD OF INVENTION

This invention relates generally to the field of the composition and manufacture of particle board. More particularly, this invention relates to the field of manufacturing particle board from lignocellulosic materials including scrap lignocellulosic materials, and to the manufacture of particle board including as one of the components thereof plastics and scrap plastic materials, and to the manufacture of particle board by means of extrusion.

BACKGROUND OF INVENTION

An important problem in modern society is to make the maximum use of all available materials, including the reuse of scrap materials back into useful products. One component of the modern emphasis on recycling materials is the use of scrap materials in the production of particle board.

The customary method for the manufacture of particle board is to use wood in the form of sawdust, wood particles and fibers which have been defibrated by a mechanical or chemical defibrating process. These materials are typically mixed with a form of adhesive or binder. There are three general catagories of binders commonly in use. Formaldehyde-based binders are one category of binder commonly used, although this material is under increasing scrutiny due to the toxicity of the underlying formaldehyde compounds. A second customary form of binder material in common use are polyurethane-type binders, including under this general term specific compounds such as polymeric diphenylmethane diisocyanate and related compounds generally referred to as "MDI". The third general category of binder involves phenolic-based binders. The phenolic-based binders tend to be more costly, but offer quality advantages in particle boards of higher value.

The customary process of manufacturing particle board involves the blending of the binder with the wood or wood-related particles into a substantially dry blend in which typically about 6% by weight would be binder. This blend is deposited onto a moving mat or belt (hereinafter "belt" for simplicity) either by an "air laying process" or laid onto the belt following wetting; both processes well known in the field. The material following deposition is typically held in place on the belt by means of a vacuum suction applied from below the moving belt, which is typically made to be porous for precisely this purpose. Typically, to manufacture particle boards of three-fourths inch, a deposition on the belt of up to 15 inches may be required. The final particle board is manufactured by pressing the material deposited on the belt into the final particle board with the required density. Commonly, the material will be pressed in a two-step process. A prepressing applied to the material on the mat may be used to reduce the size (that is, thickness) of the material prior to pressing to final density. Pressing to final density then follows, often accompanied by simultaneous heating of the material. Both continuous pressing as well as pressing in a batch process are used in the industry. The density of the final particle board produced by this process is predetermined when material is deposited on the moving belt by adjusting the amount of material (per square foot) deposited on the moving belt prior to pressing.

An alternative process for the manufacture of particle board is to use an extrusion process. In the manufacture of extruded particle board, the starting material is likewise wood, wood-related or other lignocellulosic products blended together with a binder or other substances which impart desirable properties to the final product. For extruded particle board, however, it is not necessary to include in the blend of starting materials a refined wood or lignocellulosic fiber. Instead, it is common in the production of extruded particle board to include plastic (typically scrap plastic) in the blend of starting material. The amount of plastic may vary somewhat from process to process, but typically an equal 50%–50% blend of plastic and wood products (by weight) are included in the starting material for extrusion. The inclusion of plastic imparts a viscosity to the starting blend facilitating extrusion through a die. This process is most useful for the production of long lengths of material with typical cross-sectional dimensions much less than their typical length dimensions. Such material may include floor boards, planking, moldings, window and door frames, etc. Essentially any plastic material which may itself be formed by an extrusion process can be employed along with wood in the manufacture of extruded particle board.

The production of extruded particle board typically does not involve the addition of binders to the starting blend (the plastic acting as the binding agent in this sense). However, "coupling agents" for binding the wooden material to the plastic are required to be included in the blend for extrusion. Coupling agents are essentially materials for the binding the wood and wood fiber to the plastic as the typical wood tends not to bind directly to the plastic without the assistance of special materials for facilitating the bonding. A common coupling agent is commercially available from E. I. du Pont under the tradename "Epolene".

This customary approach to production of particle board by means of extrusion described above successfully gives a material with a good surface appearance. However, the product produced thereby suffers from an important drawback in that the physical properties more closely resemble those of a filled plastic than those of particle board. Due to the relatively large proportion of plastic contained in the material (typically approximately 50%), the properties of the final material are rather like those of a plastic filled with an additive rather than those of a particle board. Thus, it is perhaps misleading to refer to such products as "extruded particle board." Rather a more correctly descriptive name would be "extruded plastic with wood filler".

Thus, the common goal in the production of extruded particle board is to reduce the amount of plastic which is included in the particle board as much as possible. The use of less plastic filler along with an increased proportion of wood material tends to produce a more economical product with more desirable physical properties, more nearly resembling those of particle board. The problem heretofore has been in reducing the mount of plastic material included in the blend while maintaining the extrudability of the material. A reduction of the amount of plastic tends to reduce the extrudability of the product, especially in the surface finish. It has proven to be a serious challenge to reduce the proportion of plastic materials used in the blend while still extruding a product with a good surface finish. The typical problem has been that the extrusion with less plastic results in a rough surface textures in the product.

The present invention demonstrates a blend of wood product and plastic such that the resulting product is capable of extrusion with good surface finish. As described below, the present invention demonstrates an extruded particle board having much less plastic material than in previous products (typically down to 20% plastic by weight), along with appropriate binders and coupling agents, while maintaining extrudability and good surface finish.

SUMMARY OF THE INVENTION

The present invention relates to an improved material and manufacturing method for extrusion of particle board. It is shown herein that the use of fine particles of wood (or other lignocellulosic materials in the form of fine particles, referred to collectively as "wood" herein), in combination with an extrudable plastic, allows an increased proportion of wood to be used (typically greater than 50% by weight, wood to plastic) and still obtain an extrudable particle board with good surface finish. The use of wood particles finer than approximately 40 mesh is used in the production of extruded particle board in the present invention. A coupling agent consisting of approximately 3% by weight of a polyurethane, MDI coupling agent is also used. This combination of fine wood particles and the above coupling agent yields good quality extruded particle board having a majority of the composition thereof consisting of wood, wood-related products or other lignocellulosic materials.

OBJECTS OF THE INVENTION

A primary object of the present invention is to produce extruded particle board in which less than approximately 50% by weight of the extruded board is plastic.

Another object of the present invention is to produce extruded particle board using waste plastic as one component thereof.

Another object of the present invention is to produce extruded particle board using waste plastics polypropylene, polyethylene or a combination thereof as a component.

Yet another object of the present invention is to produce an extruded particle board using a coupling agent consisting of a polyurethane-type coupling agent.

Yet another object of the present invention is to produce an extruded particle board at lower than customary extrusion temperatures.

Yet another object of the present invention is to produce a particle board resistant to water-induced rot.

Another object of the present invention is to produce a particle board with improved strength when compared to previous extruded particle boards.

Yet another object of the present invention is to produce a particle board with improved water resistance and water repellency when compared to previous extruded particle boards.

Another object of the present invention is to produce a particle board with improved dimensional stability, when exposed to heat or moisture, when compared to previous extruded particle boards.

Yet another object of the present invention is to produce a particle board with improved resistance to chemical attack when compared to previous extruded particle boards.

Yet another object of the present invention is to produce a particle board with improved capabilities for reshaping when compared to previous extruded particle boards.

DESCRIPTION OF PREFERRED EMBODIMENTS

The present invention relates to the production of extruded particle board consisting of a mixture of lignocellulosic material, plastic, and a suitable coupling agent. Lignocellulosic material includes wood, wood fibers, wood-related materials, and also materials derived from knaf, grasses, rice hulls, and other vegetation, all encompassed under the generic term of "lignocellulosic material". Current technology for extruding particle board uses wood materials most commonly. Therefore, for economy of language we will employ the term "wood" to mean all such lignocellulosic materials, with understanding that various wood-related products are typically the most common classes of materials expected to be used in the extrusion of particle board. Typical plastics used in this process would be polyethylene, high-density polyethylene, polypropylene, acrylics, polystyrene, polycarbonate, phenolics, polyesters, or other extrudable plastics. The plastics used in this process may be either scrap or waste plastics or new materials provided that the waste plastic is extrudable (which is not the case for typical thermosetting plastics following the thermal setting step, although the same plastic prior to thermosetting may be extrudable). Economically, it is believed that waste plastics would be the preferred component for use in extrusion (along with waste or virgin wood), perhaps following certain preprocessing such as grinding, treating etc.

The function of the coupling agent is to bind the plastic and the wood particles together with the plastic into a form suitable for extrusion. Without such coupling agent, typical plastics do not bind to wood and, therefore, do not lead to a mixture suitable for extrusion into particle board. Various coupling agents as presently in use in the industry have been described above.

In addition to the above materials, certain substantially inert filler materials may also be added to the mixture for extrusion. Typically about 10% by weight filler might be included in an extrusion mixture. For example, certain non-extrudable waste plastics can be added to the mixture and extruded into particle board as an environmentally-friendly means for the recycling and reuse of such scrap. Typical waste plastics which might be used as fillers include, melamine, thermosetting plastics following the thermoset, polyvinylchloride, polyesters, etc. Various other materials may be used as inert fillers, such as calcium carbonate, glass (typically as fibers or beads), ceramics, or other filler materials as would be obvious to those skilled in the art. The use of inert fillers would typically be to reduce costs by replacing a higher cost component with a lower cost filler material. Also, another typical motivation for the use of filler materials would be as a means of recycling and reuse waste materials which otherwise present a challenging disposal problem (such as scrap melamine). Combinations of filler materials can also be used with no essential change.

Certain additives may also be added to the extrusion mixture in order to impart desirable properties to the final extruded board. For example, water or fire resistance can be imparted to the extruded board by the addition of certain chemicals. Rot or insect resistance can also be imparted. The specific chemicals leading to such improved properties in the final extruded product are not the subject of the present invention but will be apparent to those skilled in such arts.

Previous efforts to manufacture extruded particle board from wood and plastic have had to deal with at least one major challenge. In order to extrude a particle board with a good surface finish, it was necessary to use a relatively large proportion of plastic in the extruded mixture (typically 50% or greater by weight of plastic). This tends to increase costs, and produce a particle board with properties more like those of a filled plastic than wood. Increasing the proportion of wood in the extruded mixture typically leads to a board with a relatively poor surface finish which must be machined (or sawed in the fashion of wood) to produce a commercially acceptable surface finish on the product. Machining or sawing increases the cost of the process and, perhaps more important, produces waste in the form of sawdust or scraps of extruded particle board which must itself be disposed of in an environmentally acceptable manner. Thus, the challenge to which the present invention is addressed is to increase the proportion of wood in extruded particle board while maintaining an acceptable surface finish.

An important feature of the present invention is the use of fine particles of wood in the mixture to be extruded. It is found in the present invention that wood particles finer than about 40 mesh (that is, particles passing through a screen having 40×40 openings per square inch) will permit extrusion into a particle board with acceptable surface finish and simultaneously permit the use of less plastic in the extrusion mixture. The present invention allows greater than 50% wood to be used in the mixture, and typically up to about 70–80 % wood can be used in the form of particles finer than approximately 40 mesh.

The present invention does not appear to be limited in terms of how fine the wood particles may be and still lead to acceptable extruded particle board. Wood particles as fine as 200 mesh may be used in the practice of the present invention.

In combination with the use of fine particles of wood, the present invention uses a coupling agent consisting of a polyurethane coupling agent (typically a polymeric diphenylmethane diisocyanate-MDI). This coupling agent may be combined with a suitable diluent in order to save costs. It is found in the present invention that dilution of the above coupling agent with approximately 10% to 15% by weight of furfural is preferable.

The coupling agent used in the present invention is typically added to the mixture for extrusion in an amount equal to about 3% by weight. This coupling agent tends to add water resistance to the extruded product while avoiding the necessity of using a relatively costly commercial brand name product such as "Epolene" as the wood-plastic coupling agent.

Thus, the use of fine particles of wood and a suitable coupling agent leads to the manufacture of extruded particle board having a much higher fraction of wood, typically exceeding 50% and up to 70–80% by weight. With such a high fraction of wood, it is not necessary to use extrusion temperatures as high as required in process having less wood in the extrusion mixture. When a larger fraction of plastic is present in the extruded mixture, typical processing temperatures of around 360 deg. F. are used. However, by utilizing the present invention in which a higher fraction of wood is employed, lower processing temperatures may be successful used. The present invention uses processing temperatures of about 260 deg. F., reducing the energy required in the present process and, hence, reducing processing costs.

The use of fine particles of wood along with the coupling agent of the present invention allows different types of wood to be mixed into a single extruded particle board. The finer particles of wood seem to facilitate joining different types of wood and other materials into a single extruded particle board. However, the detailed mechanism by which this occurs has not been scientifically determined.

I claim:

1. A mixture for extrusion comprising:
   a) lignocellulosic particles comprising at least 50% by weight of said mixture, wherein said lignocellulosic particles are finer than approximately 40 mesh; and,
   b) extrudable plastic and a coupling agent capable of bonding said extrudable plastic to said lignocellulosic particles upon extrusion.

2. A mixture as in claim 1 wherein said lignocellulosic particles comprise at least 70% by weight of said mixture.

3. A mixture as in claim 1 wherein said lignocellulosic particles comprise wood particles.

4. A mixture as in claim 1 wherein said coupling agent comprises a polyurethane coupling agent.

5. A mixture as in claim 4 wherein said coupling agent comprises approximately 1% to 3% by weight of said mixture.

6. A mixture as in claim 5 further comprising a diluent mixed with said coupling agent in an mount of approximately 10% to 15% by weight.

7. A mixture as in claim 6 wherein said diluent comprises furfural.

8. A mixture as in claim 1 further comprising, as an additional component of said mixture, a substantially inert filler material.

9. A mixture as in claim 8 wherein said filler material has a non-extrudable plastic as at least one component thereof.

10. A mixture as in claim 9 wherein said non-extrudable plastic comprises at least one of the following; melamine, phenolic plastic, polystyrene, and a thermoset plastic.

11. A mixture as in claim 8 wherein said filler material comprises glass.

12. A method for extruding particle board comprising the steps of:
   a) mixing at least 50% by weight of lignocellulosic particles finer than approximately 40 mesh with extrudable plastic; and,
   b) blending therein approximately 3% by weight of a coupling agent, said coupling agent comprising a polyurethane coupling agent, resulting in an extrudable mixture; and,
   c) extruding said mixture at a temperature of approximately 260 degrees Fahrenheit.

13. A method for extruding particle board as in claim 12 further comprising the step of adding to said extrudable mixture substantially inert filler material prior to the extrusion thereof.

14. A method for extruding particle board as in claim 12 wherein said inert filler material comprises at least one non-extrudable plastic.

* * * * *